US009773485B2

(12) United States Patent
Skulina et al.

(10) Patent No.: US 9,773,485 B2
(45) Date of Patent: Sep. 26, 2017

(54) CONTROL APPARATUS

(71) Applicant: SKOOGMUSIC LTD, Edinburgh Lothian (GB)

(72) Inventors: David Skulina, Edinburgh (GB); Pasidu Pallawela, Edinburgh (GB)

(73) Assignee: SKOOGMUSIC LTD, Edinburgh (GB)

( * ) Notice: Subject to any disclaimer, the term of this patent is extended or adjusted under 35 U.S.C. 154(b) by 0 days.

(21) Appl. No.: 15/311,826

(22) PCT Filed: May 19, 2015

(86) PCT No.: PCT/GB2015/051460
§ 371 (c)(1),
(2) Date: Nov. 16, 2016

(87) PCT Pub. No.: WO2015/177527
PCT Pub. Date: Nov. 26, 2015

(65) Prior Publication Data
US 2017/0092249 A1    Mar. 30, 2017

(30) Foreign Application Priority Data
May 19, 2014  (GB) .................................. 1408833.0

(51) Int. Cl.
*G01L 5/16* (2006.01)
*G10H 1/34* (2006.01)
(Continued)

(52) U.S. Cl.
CPC ............... *G10H 1/34* (2013.01); *G01L 5/161* (2013.01); *G01L 5/162* (2013.01); *G01L 5/223* (2013.01);
(Continued)

(58) Field of Classification Search
CPC ......... G10H 1/34; H01C 10/10; H01C 10/106
(Continued)

(56) References Cited

U.S. PATENT DOCUMENTS 2,375,178 A  *  5/1945  Ruben .................. H01C 10/106
                                                      29/419.1
2,472,214 A  *  6/1949  Hurvitz ................. G01L 9/0002
                                                      324/691
(Continued)

FOREIGN PATENT DOCUMENTS

| CN | 101996623 | 3/2011 |
|---|---|---|
| EP | 3270322 | 6/1988 |

(Continued)

OTHER PUBLICATIONS

International Search Report of Counterpart PCT International Application No. PCT/GB2015/051460.
(Continued)

*Primary Examiner* — David Warren
(74) *Attorney, Agent, or Firm* — Liu & Liu

(57) ABSTRACT

The present invention relates to control (apparatus 70). The control apparatus (70) comprises a mass of resilient conductive material (56) having an electrical property which changes in dependence on deformation of the conductive material. The control apparatus (70) further comprises at least three electrodes (74, 76, 78, 80, 82, 84) in contact with the mass of resilient conductive material (56) at spaced apart locations to thereby define at least two electrical paths through the mass of resilient conductive material between different pairs of the electrodes. The control apparatus (70) is configured such that there is a change in a measurable electrical property between each of the at least two different pairs of electrodes in dependence on deformation of the mass of resilient conductive material. More than one of the at least three electrodes (74, 76, 78, 80, 82, 84) move upon deformation of the mass of resilient conductive material (56).

19 Claims, 5 Drawing Sheets

(51) Int. Cl.
*G01L 5/22* (2006.01)
*H01C 1/14* (2006.01)
*H01C 10/10* (2006.01)

(52) U.S. Cl.
CPC .............. *H01C 1/14* (2013.01); *H01C 10/10* (2013.01); *H01C 10/106* (2013.01); *G10H 2220/561* (2013.01)

(58) Field of Classification Search
USPC .................. 345/161, 156, 173; 84/615, 653; 178/18.01
See application file for complete search history.

(56) References Cited

U.S. PATENT DOCUMENTS

| | | | | |
|---|---|---|---|---|
| 2,987,687 A * | 6/1961 | Palmeri | .................... | H01B 1/04 252/519.33 |
| 3,453,920 A * | 7/1969 | Scherer | ................ | B06B 1/0644 73/649 |
| 3,629,774 A * | 12/1971 | Crites | ................. | H01C 10/106 219/528 |
| 3,960,044 A * | 6/1976 | Nagai | ................. | G10H 1/0558 200/511 |
| 3,969,969 A * | 7/1976 | Clark, Jr. | ............. | G10H 1/0558 84/682 |
| 4,093,563 A * | 6/1978 | Eaton | ........................ | C08K 3/08 252/512 |
| 4,203,088 A * | 5/1980 | Sado | .................... | H01C 10/106 338/114 |
| 4,213,367 A * | 7/1980 | Moog | ................. | G10H 1/0551 84/689 |
| 4,257,305 A * | 3/1981 | Friend | ................. | G10H 1/0558 338/114 |
| 4,272,657 A * | 6/1981 | Iijima | ................. | H01H 13/702 200/5 A |
| 4,273,017 A * | 6/1981 | Dodds | .................... | G10H 1/346 200/16 A |
| 4,273,682 A * | 6/1981 | Kanamori | ................ | C08K 9/00 252/511 |
| 4,383,386 A * | 5/1983 | Giordano | ........... | A63H 33/3055 446/397 |
| 4,416,178 A * | 11/1983 | Ishida | ................. | G10H 1/344 200/5 A |
| 4,463,647 A * | 8/1984 | Luce | ........................ | G10H 1/02 84/684 |
| 4,503,745 A * | 3/1985 | Clark, Jr. | ................ | G10H 1/057 84/689 |
| 4,852,443 A * | 8/1989 | Duncan | ................ | G10H 1/0551 200/600 |
| 4,892,023 A * | 1/1990 | Takeuchi | ............. | G10H 1/0556 84/687 |
| 4,903,566 A * | 2/1990 | McClish | ................ | G10H 3/185 84/734 |
| 5,009,146 A * | 4/1991 | Manabe | ................. | G10H 1/055 84/615 |
| 5,099,742 A * | 3/1992 | Meno | ................... | G10H 1/0556 84/690 |
| 5,119,713 A * | 6/1992 | Usa | ........................ | G10H 1/186 84/628 |
| 5,178,012 A * | 1/1993 | Culp | ........................ | G01P 15/09 73/510 |
| 5,206,449 A * | 4/1993 | McClish | ................ | G10H 3/182 84/723 |
| 5,241,126 A * | 8/1993 | Usa | ........................ | G10H 1/053 84/615 |
| 5,510,812 A | 4/1996 | O'Mara et al. | | |
| 5,610,355 A * | 3/1997 | Hasebe | .................. | G10H 1/34 84/658 |
| 5,726,952 A * | 3/1998 | Eckert | .................... | G10K 13/00 310/322 |
| 5,796,059 A * | 8/1998 | Boon | .................... | A61B 5/1115 200/85 R |
| 6,193,788 B1 * | 2/2001 | Nojima | ..................... | B03C 3/40 29/34 R |
| 6,214,490 B1 * | 4/2001 | Pate | ....................... | H01M 2/263 429/235 |
| 6,323,659 B1 * | 11/2001 | Krahn | .................. | G01N 27/226 324/554 |
| 6,448,488 B1 * | 9/2002 | Ekhaus | .................. | G10H 1/125 84/622 |
| 6,597,347 B1 * | 7/2003 | Yasutake | ............... | G06F 3/0338 178/18.01 |
| 7,056,297 B2 * | 6/2006 | Dohno | ............. | A63B 21/00181 310/316.01 |
| 7,064,561 B2 * | 6/2006 | Morimoto | ................. | G01L 1/20 324/691 |
| 7,135,630 B2 * | 11/2006 | Maruhashi | ........... | G10D 13/027 84/411 P |
| 7,178,405 B2 * | 2/2007 | Sato | ........................ | G01L 1/205 73/818 |
| 7,276,917 B2 * | 10/2007 | Deangelis | ............ | G01D 5/2405 324/661 |
| 7,301,351 B2 * | 11/2007 | Deangelis | ............ | G01D 5/2405 324/658 |
| 7,408,109 B1 * | 8/2008 | Freitas | ..................... | G10H 3/12 84/687 |
| 7,509,881 B2 * | 3/2009 | Divigalpitiya | ......... | H01H 1/029 73/862.041 |
| 7,886,621 B2 | 2/2011 | Smith et al. | | |
| D645,468 S * | 9/2011 | Skulina | ........................ | D14/388 |
| 8,088,988 B2 * | 1/2012 | Randazzo | ............. | G10H 3/143 84/723 |
| 8,305,361 B2 * | 11/2012 | Yang | ........................ | G06F 3/044 178/18.01 |
| 8,509,900 B2 * | 8/2013 | Boyd | ........................ | A61N 1/0512 607/41 |
| 8,605,045 B2 * | 12/2013 | Mamba | ................. | G06F 3/0412 345/173 |
| 8,621,942 B2 * | 1/2014 | Sleeman | ................ | G01L 1/146 73/862.626 |
| 8,805,509 B2 * | 8/2014 | Boyd | ........................ | A61N 1/0512 607/41 |
| 8,869,632 B2 * | 10/2014 | Tsuchiya | ................ | B25J 13/085 73/862.59 |
| 8,904,876 B2 * | 12/2014 | Taylor | ....................... | G01L 1/18 361/283.4 |
| 9,075,404 B2 * | 7/2015 | McMillen | .............. | G10H 1/348 |
| 9,076,419 B2 * | 7/2015 | McMillen | ................ | G10H 1/02 |
| 9,336,761 B1 * | 5/2016 | Marquez | ............... | G10H 1/0558 |
| 9,358,383 B2 * | 6/2016 | Boyd | ........................ | A61N 1/0512 |
| 9,442,614 B2 * | 9/2016 | McMillen | .............. | G06F 3/044 |
| 9,453,774 B2 * | 9/2016 | Bao | ........................ | G01L 7/041 |
| 2001/0039871 A1 | 11/2001 | Ono et al. | | |
| 2006/0207409 A1 * | 9/2006 | Kavana | .................. | A63H 30/04 84/600 |
| 2007/0119293 A1 * | 5/2007 | Rouvelle | ............... | G10H 1/055 84/633 |
| 2008/0219464 A1 * | 9/2008 | Smith | ....................... | A61B 7/04 381/67 |
| 2009/0140996 A1 * | 6/2009 | Takashima | ............ | G06F 1/1626 345/173 |
| 2010/0225340 A1 | 9/2010 | Smith et al. | | |
| 2011/0018556 A1 | 1/2011 | Le et al. | | |
| 2011/0237103 A1 * | 9/2011 | Harlan | ............... | H01R 13/2414 439/271 |
| 2012/0056810 A1 | 3/2012 | Skulina et al. | | |
| 2014/0277951 A1 | 9/2014 | Kim | | |
| 2015/0098593 A1 * | 4/2015 | Yueh | ....................... | H04R 17/02 381/190 |
| 2017/0092249 A1 * | 3/2017 | Skulina | ................... | G10H 1/34 |

FOREIGN PATENT DOCUMENTS

| | | |
|---|---|---|
| EP | 1901048 | 3/2008 |
| FR | 2986162 | 8/2013 |
| GB | 2235563 | 3/1991 |

(56) References Cited

FOREIGN PATENT DOCUMENTS

| JP | 2008-076785 | 4/2008 |
|---|---|---|
| WO | 93/08540 | 4/1993 |
| WO | 2011/061511 | 5/2011 |

OTHER PUBLICATIONS

Smith et al., "Digital Foam Interaction Techniques for 3D Modeling", pp. 61-68.

* cited by examiner

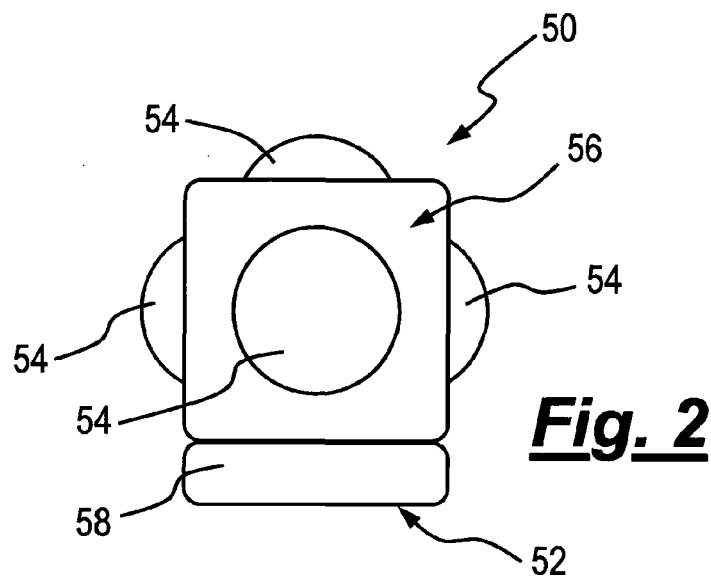
*Fig. 2*
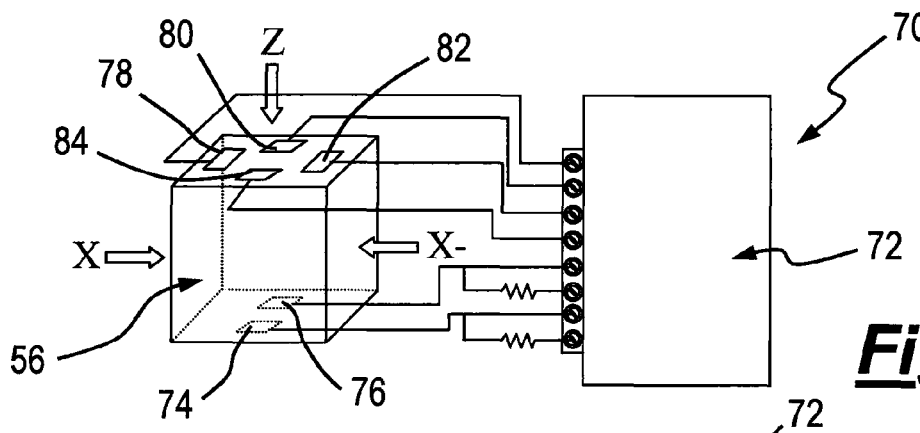
*Fig. 3A*
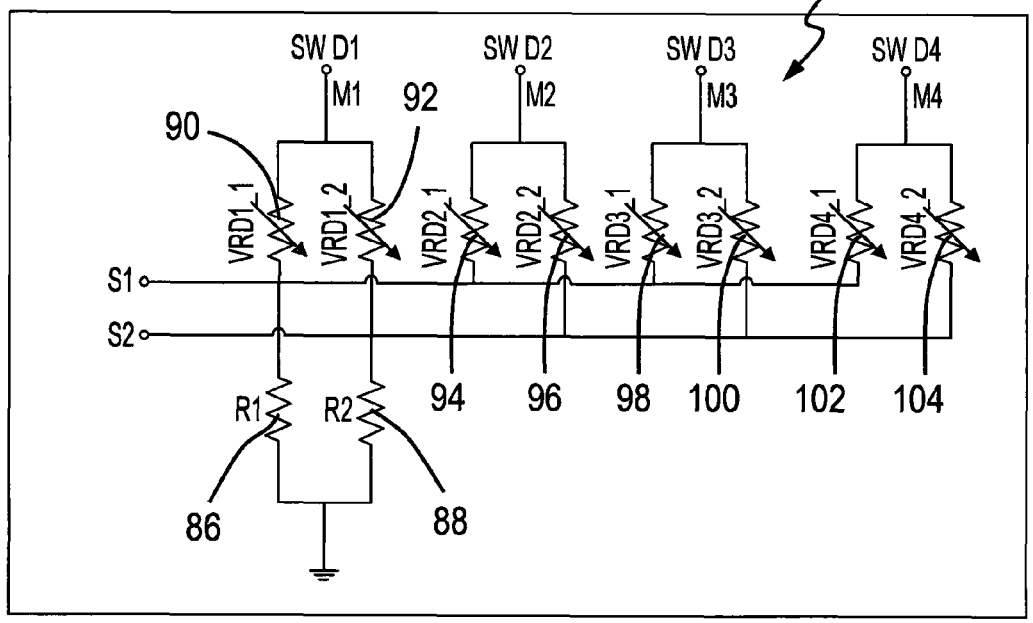

CONTROL APPARATUS

FIELD OF THE INVENTION

The present invention relates to control apparatus and in particular but not exclusively to control apparatus for generating sound in dependence on actuation by a user, such as by manipulation of the control apparatus by the user.

BACKGROUND ART

Use of known sound generating apparatus such as musical instruments normally requires a fair degree of dexterity. Such known sound generating apparatus is therefore generally unsuited to use by persons with a wide range of physical, mental and behavioural disabilities as well as those who are inexperienced in playing or too young to play a musical instrument. GB 2479323 describes apparatus for generating sound which is more suited to use by such persons.

The apparatus of GB 2479323 is generally cuboid in form and comprises a resiliently deformable body which defines an outer surface of the apparatus. The apparatus of GB 2479323 further comprises an optical joystick arrangement which is supported within the deformable body and which is operative to sense deformation of the deformable body and provide a sensor output signal in dependence on deformation.

In one form the apparatus of GB 2479323 comprises a sound generating arrangement having a loudspeaker which is operative to emit sound in dependence on the sensor output signal. In another form the apparatus of GB 2479323 comprises a communications port which provides for conveying of the sensor output signal to the like of a Personal Computer comprising a sound generating arrangement. A user deforms the deformable body of the apparatus of GB 2479323 by, for example, pressing the exterior surface of the apparatus. The deformation is sensed by the optical joystick arrangement and the sound generating arrangement is operative to emit sound in dependence on the sensor output signal received from the optical joystick arrangement. The apparatus of GB 2479323 is configured to emit different tones in dependence on different kinds of deformation by, for example, pressing the exterior surface of the apparatus in different locations and by performing different twisting actions on the deformable body. A user can therefore perform a series of different manipulations of the deformable body to generate a corresponding series of different tones.

The present inventors have become appreciative of shortcomings of the apparatus of GB 2479323 and have devised the present invention in the light of this appreciation. It is therefore an object for the present invention to provide control apparatus and in particular but not exclusively control apparatus for generating sound in dependence on actuation by a user, such as by manipulation of the control apparatus by the user.

STATEMENT OF INVENTION

According to a first aspect of the present invention there is provided control apparatus comprising:
a mass of resilient conductive material having an electrical property which changes in dependence on deformation of the conductive material; and
at least three electrodes in contact with the mass of resilient conductive material at spaced apart locations to thereby define at least two electrical paths through the mass of resilient conductive material between different pairs of the electrodes,
the control apparatus being configured such that there is a change in a measurable electrical property between each of the at least two different pairs of electrodes in dependence on deformation of the mass of resilient conductive material, more than one of the at least three electrodes moving upon deformation of the mass of resilient conductive material.

The control apparatus comprises a mass of resilient conductive material having an electrical property which changes in dependence on deformation of the conductive material. A user may deform the mass of resilient conductive material by, for example, pressing an exterior surface of the mass of resilient conductive material. The control apparatus further comprises at least three electrodes which are in contact with the mass of resilient conductive material at spaced apart locations. At least two electrical paths through the mass of resilient conductive material are thus defined between different pairs of the electrodes. Two different pairs of electrodes may have an electrode in common. The control apparatus may be configured such that at least one electrode in each of at least two different pairs of electrodes moves relative to the other electrode in dependence on deformation of the mass of resilient conductive material, for example by the user, to thereby change the measurable electrical property between each of the at least two different pairs of electrodes. The measurable electrical property between each of the at least two different pairs of electrodes may therefore reflect displacement of electrodes in dependence on deformation of the mass of resilient conductive material such as by a user. As described in more detail below, the electrical property between each of the at least two different pairs of electrodes may be measured and the measurements used to provide for sound production. The control apparatus may therefore be used to provide for sound generation in dependence on manipulation of the mass of resilient conductive material as described above with reference to GB 2479323. The present invention is directed to control apparatus which may in particular but not exclusively be applied to sound generation on account of the present inventors appreciating that the control apparatus is of wider application.

The configuration of the control apparatus according to the present invention in respect of the mass of resilient conductive material and the at least three electrodes is simpler than the corresponding control apparatus of GB 2479323 and may therefore offer advantages with regard to the like of ease of manufacture and cost. As will become apparent from the following description the control apparatus according to the present invention may also offer advantages with regard to ease of sensing certain manipulations of the mass of resilient conductive material.

As mentioned above, the mass of resilient conductive material has an electrical property which changes in dependence on deformation of the conductive material. More specifically the mass of resilient conductive material may have a resistance which changes in dependence on deformation of the conductive material. As the mass of resilient conductive material is compressed the resistance may reduce. Conversely the resistance may increase as the mass of resilient conductive material expands, such as when returning to its original form after being compressed. The measurable electrical property may therefore comprise resistance.

The control apparatus may comprise processing apparatus which is configured to measure the measurable electrical property. The processing apparatus may comprise plural electrical conductors, each electrical conductor being electrically coupled to a different one of the plural electrodes. The plural electrical conductors may be operative to provide for measurement of the measurable electrical property.

Where the measurable electrical property comprises resistance the processing apparatus may be configured to convert resistance to at least one of voltage and current. More specifically the processing apparatus may be configured to convert resistance to voltage. The processing apparatus may comprise a voltage divider arrangement. The voltage divider arrangement may comprise a resistance between electrodes in a pair of electrodes in series with a reference resistance. In use, a change in resistance between electrodes in the pair of electrodes cause by deformation of the mass of resilient conductive material may produce a change in voltage at the series connection between the resistance and the reference resistance. The voltage divider arrangement may be configured such that the resistance between electrodes of each of plural pairs of electrodes may be in series with the same reference resistance. In one form the voltage divider arrangement may be comprised in a unitary arrangement comprising the mass of resilient conductive material. In another form the voltage divider arrangement may be spaced apart from a unitary arrangement comprising the mass of resilient conductive material. Depending on the form of the present invention further features of the processing apparatus, which are described below, may be either comprised in a unitary arrangement comprising the mass of resilient conductive material or spaced apart from a unitary arrangement comprising the mass of resilient conductive material.

The control apparatus may be operative such that at least one electrode is a reference electrode which is common to the pairs of electrodes which each provide a measurable electrical property. For example and where the control apparatus comprises five electrodes, one of the five electrodes may be the reference electrode which is common to four pairs of electrodes and the other electrode of each of the four pairs of electrodes may be a different one of the remaining four electrodes. The reference electrode may be substantially immobile at least during measurement of the measurable electrical property of the pairs of electrodes. According to one approach the reference electrode may be disposed and the control apparatus may be otherwise configured such that the reference electrode may be substantially immobile during deformation of the mass of resilient conductive material. For example the reference electrode may be located at or towards a base of the control apparatus such that deformation of the mass of resilient conductive material causes substantially no movement of the reference electrode. According to another example the reference electrode may be located at a centre of the mass of resilient conductive material whereby deformation of the mass of resilient conductive material causes little or substantially no movement of the reference electrode. According to another approach, one of the plural electrodes may be determined to be the reference electrode in dependence on measurements of the measurable electrical property of the pairs of electrodes. More specifically the control apparatus may be configured to make measurements between different pair combinations of electrodes and on the basis of the measurements determine which of the electrodes is substantially immobile or moves the least, for example in response to a certain form of deformation or certain forms of deformation.

The control apparatus may be operative such that each of plural electrodes is a reference electrode with each reference electrode being common to the pairs of electrodes which each provide a measurable electrical property. An electrical path through the mass of resilient conductive material may be defined between each reference electrode and each of the remaining electrodes. More specifically each of first and second electrodes may be a reference electrode (i.e. first and second reference electrodes) and thus each may be common to the pairs of electrodes which each provide a measurable electrical property. For example and where the control apparatus comprises six electrodes, two of the six electrodes may be the first and second reference electrodes which are each common to four pairs of electrodes with the other electrode of each of the four pairs of electrodes being a different one of the remaining four electrodes. As described above the plural reference electrodes may be substantially immobile at least during measurement of the measurable electrical property of the pairs of electrodes. Where the processing apparatus comprises a voltage divider arrangement, the voltage divider arrangement may comprise plural reference resistances of a number corresponding to the number of the reference electrodes. For example and where there are two reference electrodes the voltage divider arrangement may comprise two reference resistances. More specifically each of the plural reference resistances may be in series with the resistances between pairs of electrodes constituted by a different one of the reference electrode and the remaining electrodes. The number of reference electrodes used, e.g. one or two reference electrodes, may depend on the disposition of the electrodes in the control apparatus and the complexity of deformations of the mass of resilient conductive material to which it is desired to respond. An electrode may be electrically conductive.

The present inventors have appreciated that under certain circumstances such as when the mass of resilient conductive material is deformed at different locations at the same time one may be unable to distinguish movement of one electrode relative to the other electrode in a first pair of electrodes from movement of one electrode relative to the other electrode in a second pair of electrodes. The control apparatus may therefore be configured to provide for measurement of the measurable electrical property between each of the at least two different pairs of electrodes at different times. Thus, for example, the measurable electrical property may be measured between a first pair of electrodes at a first time and the measurable electrical property may be measured between a second pair of electrodes at a second time.

Measurement of the measurable electrical property may require application of an electrical signal to at least one electrode of a pair of electrodes. For example, where the measurable electrical property comprises resistance, an electrical signal such as a voltage may be applied to an electrode to thereby pass an electrical current through an electrical path between two electrodes. More specifically an electrical potential difference may be applied between the electrodes of a pair of electrodes. An electrical signal may be applied to each of plural pairs of electrodes at different times. The measurable electrical property of each pair of electrodes may thus be measured at different times whereby movement of different electrodes may be distinguished from each other. For example and where there are four pairs of electrodes an electrical signal may be applied to each of the four pairs of electrodes in turn. Where plural electrical signals in the form of voltages are applied to respective electrode pairs, the electrical signals may be pulsed with the high portions of the plural electrical signals being time spaced from each other. The electrical signal may be applied to each of the plural pairs of electrodes in turn on a repeated basis. For example the electrical signal may be applied to each of the plural pairs of electrodes at a rate of 1 kHz.

There may be parasitic electrical components present in the control apparatus. Such parasitic electrical components may comprise the like of capacitance present at electrodes. The parasitic electrical components may increase the rise and fall times of the measurable electrical property in response to an applied pulsed electrical signal. Plural pulsed electrical signals applied to respective electrode pairs may therefore comprise a gap between time adjacent high portions of different electrical signals. The extent of the gap may be determined to take account of the spreading effect of the parasitic electrical components.

The processing apparatus may be configured to provide a control signal in dependence on measurement of the measurable electrical property between each of the at least two different pairs of electrodes. More specifically the processing apparatus may be configured to determine movement and more specifically extent movement of at least one electrode in dependence on measurement of the measurable electrical property between each of the at least two different pairs of electrodes. The control signal may be provided in dependence on the movement determination. Manipulation of the mass of resilient conductive material by a user may therefore cause movement of at least one electrode with the processing apparatus providing the control signal in dependence on electrode movement.

The control apparatus may be configured for determination of movement of at least one electrode in at least two mutually orthogonal directions. The electrodes may therefore be disposed in the control apparatus such that at least two electrical paths defined through the mass of resilient conductive material extend in at least two mutually orthogonal directions. The at least two electrical paths may need not extend solely in at least two mutually orthogonal directions but may comprise vector components which extend solely in at least two mutually orthogonal directions. Determination of movement in three mutually orthogonal directions (i.e. movement along all of the x, y and z axes of a Cartesian coordinate system) may require at least three electrical paths defined through the mass of resilient conductive material and which extend in three mutually orthogonal directions. The control apparatus may be configured accordingly by appropriate disposition of at least four electrodes to define at least three electrical paths between pairs of electrodes.

The mass of resilient conductive material may be deformed such that more than one electrode moves. For example a user may press the mass of resilient conductive material on opposite sides such that two electrodes at or near the opposite sides move towards and then subsequently move away from each other. Determination of such a form of movement may require at least five electrodes. Five electrodes may, for example, provide for movement of two electrodes with each of the remaining three electrodes defining an electrical path between each of the two moving electrodes whereby there are three electrical paths defined with respect to a first one of the two moving electrodes and three electrical paths defined with respect to a second one of the two moving electrodes. Movement of each of the two moving electrodes in three mutually orthogonal directions may be determined where the electrical paths extend in three mutually orthogonal directions. Where the control apparatus is configured for deformation in a first pair of opposite directions and in a second pair of opposite directions with the first and second pair of opposite directions being orthogonal, the control apparatus may comprise at least six electrodes. More specifically a first pair of electrodes may be spaced apart from each other along a first axis along which deformation in the first pair of opposite directions is liable to occur and a second pair of electrodes may be spaced apart from each other along a second axis along which deformation in the second pair of opposite directions is liable to occur. Such an arrangement of electrodes may be appropriate, for example, in control apparatus having a mass of resilient conductive material in the form of a cube and in which deformation is liable to occur in opposite directions in only two of three orthogonal axes such as in control apparatus comprising a base on one side which is not liable to deformation. Such an arrangement of electrodes may provide for determination of deformations further to deformation along each of three orthogonal axes. More specifically the arrangement of electrodes may provide for determination of deformation involving rotation about at least one axis and perhaps about three mutually perpendicular axes.

The electrodes may be disposed in the control apparatus such that no electrodes lie in a same plane. Such a configuration may provide for a smaller number of electrical paths compared with configurations in which electrodes lie in a same plane. According to a first example configuration the control apparatus may comprise five electrodes which are disposed in the control apparatus such that they are liable to move upon deformation of the mass of resilient conductive material and a sixth electrode which is disposed in the control apparatus such that it is liable to little or substantially no movement upon deformation of the mass of resilient conductive material with the five electrodes being disposed such that no two lie in the same plane. More specifically the five electrodes may be disposed on or near a different side of the mass of resilient conductive material and the sixth electrode may be disposed towards a centre of the mass of resilient conductive material. Five electrical paths may be defined in the first example configuration. According to a second example configuration the control apparatus may comprise four electrodes which are disposed in the control apparatus such that they are liable to move upon deformation of the mass of resilient conductive material and fifth and sixth electrodes which are disposed in the control apparatus such that they are liable to little or substantially no movement upon deformation of the mass of resilient conductive material with the four electrodes being disposed such that they lie in a first plane and the fifth and sixth electrodes being disposed such that they lie in a second plane. The first and second planes may be substantially parallel. More specifically the four electrodes may be disposed on or near a first side of the mass of resilient conductive material, such as a side opposite a base of the control apparatus, and the fifth and sixth electrodes may be disposed on or near a second side opposite the first side, such as at or near the base of the control apparatus. Eight electrical paths are defined in the second example configuration.

Movement determination may be achieved by way of digital processing. The processing apparatus may therefore comprise analogue-to-digital conversion apparatus which is operative to receive measurements of the measurable electrical property and provide corresponding digital signals. The processing apparatus may further comprise a digital processor, such as may be comprised in a microprocessor or a digital signal processor, which is operative to receive the corresponding digital signals and a make a movement determination in dependence thereon. The microprocessor and perhaps further features of the processing apparatus such as the filter described below may be comprised in a general purpose computer such as a Personal Computer. The processing apparatus may be configured to determine a direction of movement of at least one electrode such as a direction of movement relative to another electrode in dependence on the measurable electrical property between each of the at least two different pairs of electrodes. Alternatively or in addition the processing apparatus may be configured to determine an extent of movement of at least one electrode.

The processing apparatus may be configured to determine electrode movement in accordance with a trilateration approach and more specifically a three dimensional trilateration approach. Direction of movement may be determined in dependence on a pattern recognition approach. More specifically specific patterns of direction of movement of electrodes may be measured and stored in response to specific forms of deformation of the mass of resilient conductive material. Specific patterns of direction of movement of electrodes may depend on the configuration of the control apparatus, for example, with regard to the number of electrodes and their disposition. Specific patterns of direction of movement of electrodes may therefore need to be determined for each configuration of control apparatus. For example a specific pattern of change, such as an increase, decrease or no change, in measurable electrical property of each electrode pair may be characteristic of a particular form of deformation involving movement of one or more electrodes. The stored patterns of direction of movement may then be applied during subsequent use of the control apparatus to determine the same or similar direction of electrode movement. The processing apparatus may be configured to determine movement of two electrodes at the same time. A phenomenon has been observed in control apparatus having a cuboid mass of resilient conductive material and five electrodes on or near a respective side of the mass of resilient conductive material and a sixth electrode at the centre of the mass of resilient conductive material. More specifically when a first side of the mass of resilient conductive material is pressed the electrical property of the electrical path between the electrode on the first side and the sixth electrode exhibits a reduction and the electrical property of the electrical path between the each of the other electrodes and the sixth electrode exhibits an increase whereas it was expected that the electrical property of the electrical path between each of the other electrodes and the sixth electrode would exhibit a reduction. Phenomena such as the presently described phenomenon may simplify direction of movement determination.

As mentioned above, the processing apparatus may be configured to determine electrode movement in accordance with a trilateration approach. The control apparatus may be configured such that at least two electrodes are spaced apart from each other by a known distance. For example in a four electrode arrangement, the separation between three of the electrodes in three axes may be known. Computation involved in the trilateration approach may thus be simplified. In certain embodiments of the present invention each of at least one reference electrode, as defined hereinabove, may be equidistant to all other electrodes of the control apparatus when the mass of resilient conductive material is undeformed.

There may be no linear proportionality between change in the measurable electrical property and extent of movement of an electrode. The processing apparatus may therefore be configured to apply a transfer function to measurements of the electrical property to take account of such a lack of linear proportionality. The transfer function may be determined, for example, by making calibration measurements before the control apparatus is brought into use with the transfer function being stored in the processing apparatus.

The processing apparatus may be configured to provide for self-calibration of the control apparatus. As described above the mass of resilient conductive material returns to its original shape or near its original shape after deformation with the latter circumstance tending to arise after more prolonged use of the control apparatus. It may not be important for proper functioning of the control apparatus for the change in measurable property to be related to the original locations of the electrodes with it being merely sufficient for the measurable property to be related to a change from a current undeformed condition. The processing apparatus may therefore measure the measurable property when the mass of resilient conductive material is undeformed and use such measurement as a reference basis to determine the change of the measurable property when the mass of resilient conductive material is subsequently deformed.

The mass of resilient conductive material may comprise gaseous voids. The mass of resilient conductive material may comprise a polymer such as polyurethane. Conductive material may be dispersed through the resilient conductive material. The conductive material may comprise conductive particles. The conductive material may comprise carbon black. The mass of resilient conductive material may be integrally formed. Alternatively the mass of resilient conductive material may be formed from plural resilient conductive elements. The plural resilient conductive elements may be disposed in relation to each other such that they are in electrical communication.

The mass of resilient conductive material may be configured to be deformable along at least two orthogonal directions and more specifically along three mutually orthogonal directions. Alternatively or in addition the mass of resilient conductive material may be configured to be deformable around at least two orthogonal axes and more specifically around three mutually orthogonal axes.

The mass of resilient conductive material may define a polyhedron. More specifically the mass of resilient conductive material may be generally and more specifically substantially cuboid in form. Alternatively the mass of resilient conductive material may be of more rounded form and may, for example, be spherical or cylindrical. The mass of resilient conductive material may have an exterior surface profile which defines plural areas which are intended to be pressed by a user. The plural areas may be defined by way of the like of protrusions or recesses. Electrodes may be located near the plural areas. The mass of resilient conductive material may define a recess for receiving other apparatus, such as electronic apparatus. The mass of resilient conductive material may therefore define a pocket for receiving electronic apparatus. The mass of resilient conductive material may be configured to fit around other apparatus, such as electronic apparatus. The control apparatus may thus be configured as a sleeve for electronic apparatus and more specifically portable electronic apparatus such as a smart phone, tablet computer or the like.

At least one electrode may be located on an exterior surface of the mass of resilient conductive material. Alternatively or in addition at least one electrode may be located within the mass of resilient conductive material but near an exterior surface of the mass of resilient conductive material.

The processing apparatus may comprise a filter which is operative to filter signals received from the plural electrodes. The filter may be configured to reduce noise such as 50 Hz noise. Alternatively or in addition the filter may be configured to reduce a response arising from a slow return of the mass of resilient conductive material from deformation. The mass of resilient conductive material may rebound to a large extent relatively quickly followed by a more extended period during which the mass of resilient conductive material finally recovers its original shape. The filter may therefore comprise a high pass filter which is operative to reduce a response arising from a slow return of the mass of resilient conductive material from deformation.

The control apparatus may further comprise audio apparatus which is operative in dependence on measurement of the measurable electrical property of the at least two different pairs of electrodes. More specifically the audio apparatus may be operative in dependence on a signal received from the processing apparatus. The audio apparatus may comprise sound emitting apparatus such as a loudspeaker. Alternatively or in addition the audio apparatus may comprise an audio synthesiser. The control apparatus may comprise a power source which is operative to provide electrical power to, for example, apply the electrical signals pairs of electrodes in turn. The power source may comprise a battery. Alternatively or in addition the power source may comprise a connector arrangement for receiving electrical power from an external source such as a mains transformer arrangement. Where the processing apparatus is unitary with the control apparatus and the control apparatus is battery power driven the processing apparatus may be configured such that at least one component of the processing apparatus is operative to enter a power down state involving reduced power consumption. The processing apparatus may be operative to enter the power down state where measurement of the measurable property of the electrode pairs indicates there is no change in deformation of the mass of resilient conductive material. More specifically the processing apparatus may be operative to enter the power down state when there has been no such measurement for a predetermined period of time, such as five minutes.

As described above, in one form at least some of the processing apparatus may be spaced apart from a unitary arrangement comprising the mass of resilient conductive material. It may therefore be necessary to convey signals from the unitary arrangement for processing of signals. The unitary arrangement may therefore comprise a signal transmission arrangement which is operative to provide for at least one of wired and wireless transmission of signals from the unitary arrangement. Where transmission is wired the unitary arrangement may comprise an electrical connector, such as a USB socket. Where transmission is wireless the unitary arrangement may comprise a wireless transmitter which is operative according to the like of the Zigbee protocol or the Bluetooth protocol.

Although features of the control apparatus have been described above with reference to sound production, the control apparatus may be configured for use in fields other than sound production. Gaming and toys constitutes a non-exhaustive list of alternative applications of the control apparatus of the present invention.

According to a second aspect of the present invention there is provided sound generating apparatus comprising control apparatus according to the first aspect of the present invention and audio apparatus, such as a loudspeaker which is operative to emit sound in dependence on a signal received from the control apparatus. Embodiments of the second aspect of the present invention may comprise one or more features of the first aspect of the present invention such as the processing apparatus and features thereof. The sound generating apparatus may comprise plural control apparatus which are configured and operative as described above with reference to the first aspect of the present invention. Processing apparatus of the sound generating apparatus may be configured to be operative in dependence on signals from the plural control apparatus. The audio apparatus may be operative to, for example, emit sound in dependence on signals from the plural control apparatus. Each of several users may thus manipulate his or her control apparatus, with the audio apparatus being operative to emit sound in dependence on manipulation of all the control apparatus.

According to a third aspect of the present invention there is provided control apparatus comprising:
a mass of resilient material having a property which changes in dependence on deformation of the resilient material; and
at least three electrodes in contact with the mass of resilient material at spaced apart locations to thereby define at least two paths through the mass of resilient material between different pairs of the electrodes,
the control apparatus being configured such that there is a change in a measurable electrical property between each of the at least two different pairs of electrodes in dependence on deformation of the mass of resilient conductive material, more than one of the at least three electrodes moving upon deformation of the mass of resilient conductive material.

The at least two paths defined by at least three electrodes may extend in different directions. Further embodiments of the third aspect of the present invention may comprise one or more features of any previous aspect of the present invention.

According to a further aspect of the present invention there is provided control apparatus comprising: a mass of resilient conductive material having an electrical property which changes in dependence on deformation of the conductive material; and plural electrodes in contact with the mass of resilient conductive material at spaced apart locations to thereby define at least one electrical path through the mass of resilient conductive material between electrodes, the control apparatus being configured such that there is a change in a measurable electrical property between at least one pair of electrodes in dependence on deformation of the mass of resilient conductive material. Embodiments of the further aspect of the present invention may comprise one or more features of any previous aspect of the present invention.

BRIEF DESCRIPTION OF DRAWINGS

Further features and advantages of the present invention will become apparent from the following specific description, which is given by way of example only and with reference to the accompanying drawings, in which:

FIG. 2 provides a side view of control apparatus according to an embodiment of the present invention;

FIG. 3A shows control apparatus having a first configuration of electrodes and a first voltage divider arrangement;

DESCRIPTION OF EMBODIMENTS

Figure 1A:
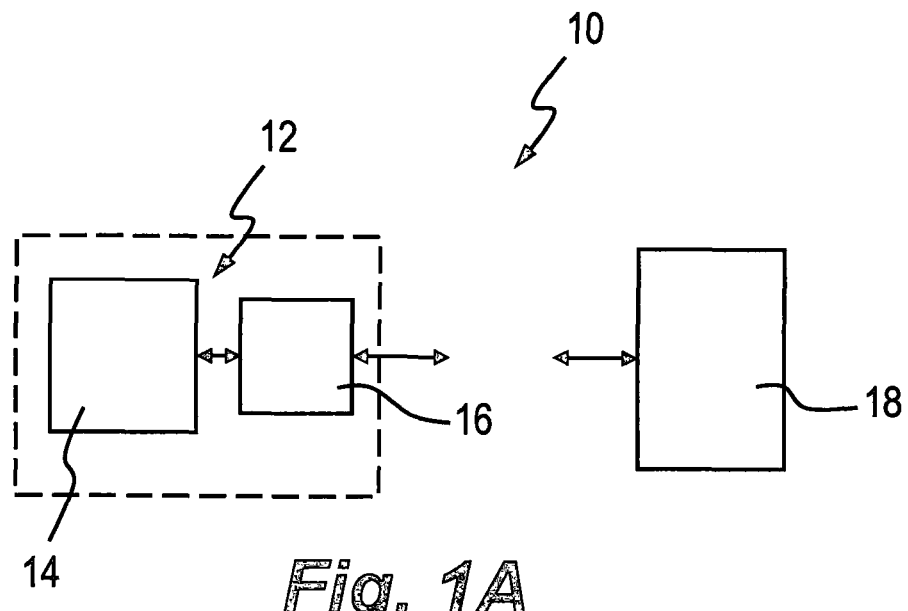
FIG. 1A is a block diagram representation of a first embodiment of sound generating apparatus.

A block diagram representation of a first embodiment of sound generating apparatus 10 is shown in FIG. 1A. The sound generating apparatus 10 of FIG. 1A comprises a unitary arrangement 12 which comprises control apparatus 14 and processing apparatus 16. The sound generating apparatus 10 further comprises a Personal Computer 18 having a loudspeaker whereby the Personal Computer 18 can emit sound in dependence on signals received from the unitary arrangement 12. The form and function of the control apparatus 14 is described below with reference to FIG. 2. The control apparatus 14 and the processing apparatus 16 are described below with reference to FIGS. 3A and 3B. The unitary arrangement 12 is spaced apart from the Personal Computer 18 albeit a short distance apart whereby sounds emitted by the Personal Computer 18 in dependence on manipulation of the control apparatus 14 by a user can be heard by the user. Each of the unitary arrangement 12 and the Personal Computer 18 comprises a communications arrangement which is operative to provide for either wired or wireless communication between the unitary arrangement 12 and the Personal Computer 18. Where the communications arrangements provide for wired communication the communications arrangements comprise a USB socket and known support circuitry. Where the communications arrangements provide for wireless communication the communications arrangements comprise a wireless transceiver, such as a transceiver configured to operate in accordance with the Zigbee protocol, the Bluetooth protocol or the like. The design of a transceiver of such form will be familiar to the skilled reader and will therefore be described no further. The Personal Computer 18 is configured to receive signals from each of several unitary arrangements 12 with the Personal Computer 18 being operative to process such signals and to emit sound in dependence on the processed signals. Several users may thus manipulate their own control apparatus and thereby produce sound by way of a single Personal Computer 18.

Figure 1B:
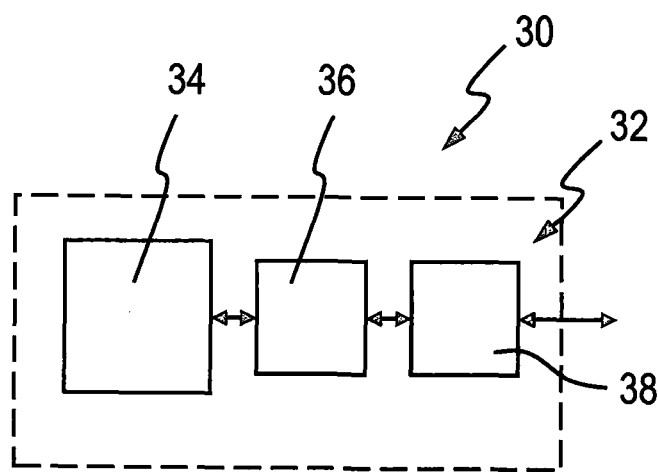
FIG. 1B is a block diagram representation of a second embodiment of sound generating apparatus.

A block diagram representation of a second embodiment of sound generating apparatus 30 is shown in FIG. 1B. The sound generating apparatus 30 comprises a unitary arrangement 32 which comprises control apparatus 34, processing apparatus 36 and sound emitting apparatus 38. The sound emitting apparatus 38 comprises a loudspeaker whereby the sound emitting apparatus 38 can emit sound in dependence on signals received from the processing apparatus 36. There is therefore no need for the Personal Computer 18 of the embodiment of FIG. 1A for production of sound in dependence on manipulation of the control apparatus 34 by a user. The unitary arrangement 32 is thus capable of stand-alone operation. In certain forms of this embodiment, the sound emitting apparatus 38 comprises a communications arrangement which is operative to provide for either wired or wireless communication. The communications arrangement is of the same form and function as described above with reference to FIG. 1A. The communications arrangement provides for communication with further (un-illustrated) apparatus such as a Personal Computer configured to operate as an audio synthesiser or a specifically designed audio synthesiser to provide for more complex audio processing than may be provided by the processing apparatus 36 comprised in the unitary arrangement 32. The form and function of the control apparatus 34 is described below with reference to FIG. 2. The control apparatus 34 and the processing apparatus 36 are described below with reference to FIGS. 3A and 3B.

In further embodiments of sound generating apparatus components of the processing apparatus 16, 36 can be split between the unitary apparatus 12, 32 and spaced apart apparatus such as a Personal Computer or an audio synthesiser in a manner other than those represented in FIGS. 1A and 1B. According to one example, control apparatus interface circuits and analogue-to-digital conversion circuitry is comprised in the unitary arrangement and signal processing circuitry is comprised in the Personal Computer or the audio synthesiser.

A side view of control apparatus 50 according to an embodiment of the present invention is shown in FIG. 2. The control apparatus 50 is of generally cuboid form and defines a substantially planar surface 52 on which the control apparatus 50 is supported on a table, a floor or the like. Each of the remaining five surfaces defines a part-spherical protrusion 54 with each protrusion being differently coloured. The protrusions 54 indicate where a user should press the control apparatus 50 to provide for sound production and provide on account of their shape and colour for ease of visual perception. It should be noted, however, that manipulation of the control apparatus 50 at locations and in fashions which involved other than the application of pressure directly at the protrusions 54 provides for sound production. The control apparatus 50 comprises a main body 56 and a base portion 58 which defines the substantially planar surface 52 on which the control apparatus 50 is supported. The main body 54 comprises a mass of resilient conductive material in the form of a cube of dimensions of 40 mm by 40 mm by 40 mm. The mass of resilient conductive material is, in one form, integrally formed. In another form the mass of resilient conductive material is formed from plural smaller masses of resilient conductive material which are disposed in relation to each other such that they are in electrical contact. The resilient conductive material is LD4011 electrostatic conductive foam from Teknis Limited of Unit 5, Valley Farm Estate, Station Road, Meldreth SG8 6JP, United Kingdom. The mass of resilient conductive material is covered with a skin of hard-wearing and readily cleaned material. In another un-illustrated embodiment, the mass of resilient conductive material is supported inside a hollow mass of resilient non-conductive material and such that deformation of the mass of resilient non-conductive material causes deformation of the mass of resilient conductive material. The mass of resilient non-conductive material is covered with a skin of hard-wearing and readily cleaned material. The base portion 58 defines a hollow rectangular space in which components of the processing apparatus are contained. In one form, the base portion 58 comprises a hollow plastics body and a skin of foam material with the mass of resilient conductive material being adhered to the upper surface of the hollow plastics body. In another form, the base portion 58 is integrally formed with the mass of resilient conductive material 56. According to this form, the mass of resilient conductive material 56 is hollowed out at its lower end and a rectangular plastics case is located in the hollowed out space to hold and protect the components of the processing apparatus. Where communication with external apparatus such as a Personal Computer is wired, an electrical connector such as a USB socket is provided in the side of the base portion 58.

In other embodiments the control apparatus has a different shape depending on how the control apparatus is to be applied. Alternative applications are described below.

According to one example, the control apparatus is long and thin and defines a pocket for receiving electronic apparatus such as a tablet computer. In this example, the exterior surface of the control apparatus defines plural coloured protrusions which provide for greater ease of visual perception and manipulation than the tablet computer itself. More specifically the control apparatus s is configured according to the embodiment of FIG. 1A and such that there is wireless communication of data to the tablet computer which constitutes the Personal Computer 18 of FIG. 1A with the tablet computer being operative to emit sounds in dependence on signals received from the control apparatus upon manipulation of the control apparatus by a user.

Control apparatus having a first configuration of electrodes 70 and a first voltage divider arrangement 72 is shown in FIG. 3A. The mass of resilient conductive material 56 is shown in FIG. 3A along with a voltage divider arrangement 72 comprised in processing apparatus. As can be seen from FIG. 3A, the control apparatus comprises six electrodes. First and second electrodes 74, 76 are located at the bottom side of the mass of resilient conductive material 56 above the base portion 58 and such that they are in contact with the mass of resilient conductive material 56. The first and second electrodes 74, 76 are therefore located such that they do not move or move very little in response to deformation of the mass of resilient conductive material 56. The first and second electrodes 74, 76 are spaced apart from each other along a notional y axis. Third to sixth electrodes 78, 80, 82, 84 are located at the upper side of the mass of resilient conductive material 56 (i.e. at the side opposite the side bearing the first and second electrodes) and such that they are in contact with the mass of resilient conductive material 56. The third to sixth electrodes 78, 80, 82, 84 are disposed such that the third and fifth electrodes are spaced apart from each other along the x axis and the fourth and sixth electrodes are spaced apart from each other along the y axis. The third to sixth electrodes 78, 80, 82, 84 are therefore located such that they move in relation to the first and second electrodes 74, 76 in response to deformation of the mass of resilient conductive material 56. The voltage divider arrangement 72 comprises first and second reference resistors 86, 88 and a biasing voltage circuit (not shown). The voltage divider arrangement 72 further comprises first to eighth material resistances 90 to 104 with each material resistance being constituted by a different electrical path between one of the first and second electrodes 74, 76 and one of the third to sixth electrodes 78, 80, 82, 84. Thus, for example, the first material resistance 90 is constituted by the electrical path through the mass of resilient conductive material 56 between the first electrode 74 and the third electrode 78, the second material resistance 92 is constituted by the electrical path through the mass of resilient conductive material 56 between the second electrode 76 and the third electrode 78 and the third material resistance 94 is constituted by the electrical path through the mass of resilient conductive material 56 between the first electrode 74 and the fourth electrode 80.

As can be seen from the circuit diagram in FIG. 3A, the first reference resistor 86 is in series with each of the four material resistances between the first electrode 74 and each of the third to sixth electrodes 78, 80, 82, 84 and the second reference resistor 88 is in series with each of the four material resistances between the second electrode 76 and each of the third to sixth electrodes 78, 80, 82, 84. The biasing voltage circuit is operative to apply a pulsed voltage signal to each of the third to sixth electrodes 78, 80, 82, 84 in turn and on a repeating basis whereby a pulse of current passes in turn through the voltage divider pairs formed by: the first and second material resistances 90, 92 and the first and second reference resistors 86, 88; the third and fourth material resistances 94, 96 and the first and second reference resistors 86, 88; the fifth and sixth material resistances 98, 100 and the first and second reference resistors 86, 88; and the seventh and eight material resistances 102, 104 and the first and second reference resistors 86, 88. A pulsed voltage signal is therefore present at the electrical connection between a material resistance and a reference resistor with the magnitude of the pulsed voltage signal being proportional to the material resistance and thus the separation between the electrodes providing the material resistance. As mentioned above, a pulsed voltage signal is applied in turn to each of the third to sixth electrodes 78, 80, 82, 84 on a repeating basis. The frequency of the pulsed voltage signal is 1 kHz. Adjacent high portions of the in turn applied pulsed voltage signals are time spaced apart from each other by an amount sufficient to allow for charging and discharge of parasitic capacitance present at the electrodes. The processing apparatus comprises a 12-bit analogue-to-digital converter which is operative to acquire and convert signals present at the electrical connections between material resistance and reference resistors. The further processing of the acquired signals with regard to deformation sensing and consequential sound production is described below with reference to FIGS. 4A and 4B.

Figure 3B:
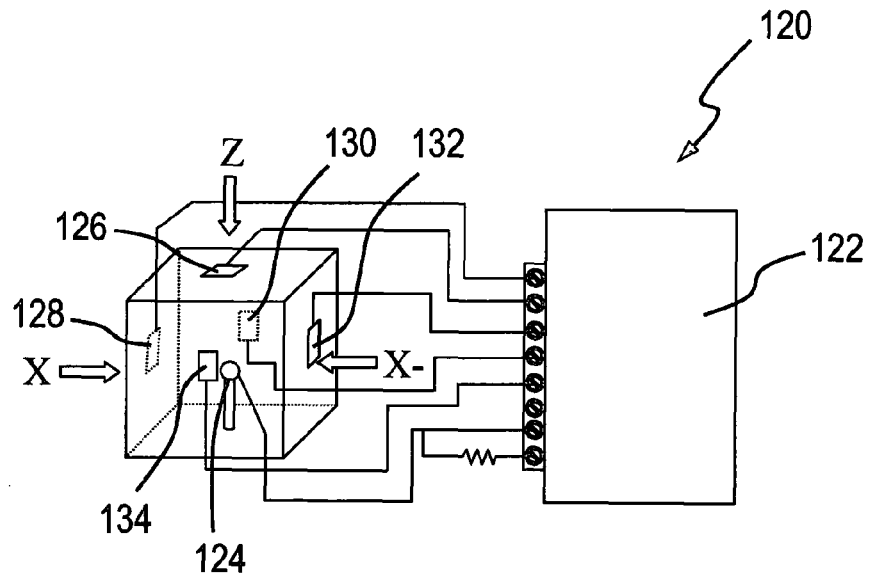
FIG. 3B shows control apparatus having a second configuration of electrodes and a second voltage divider arrangement.
Figure 3B:
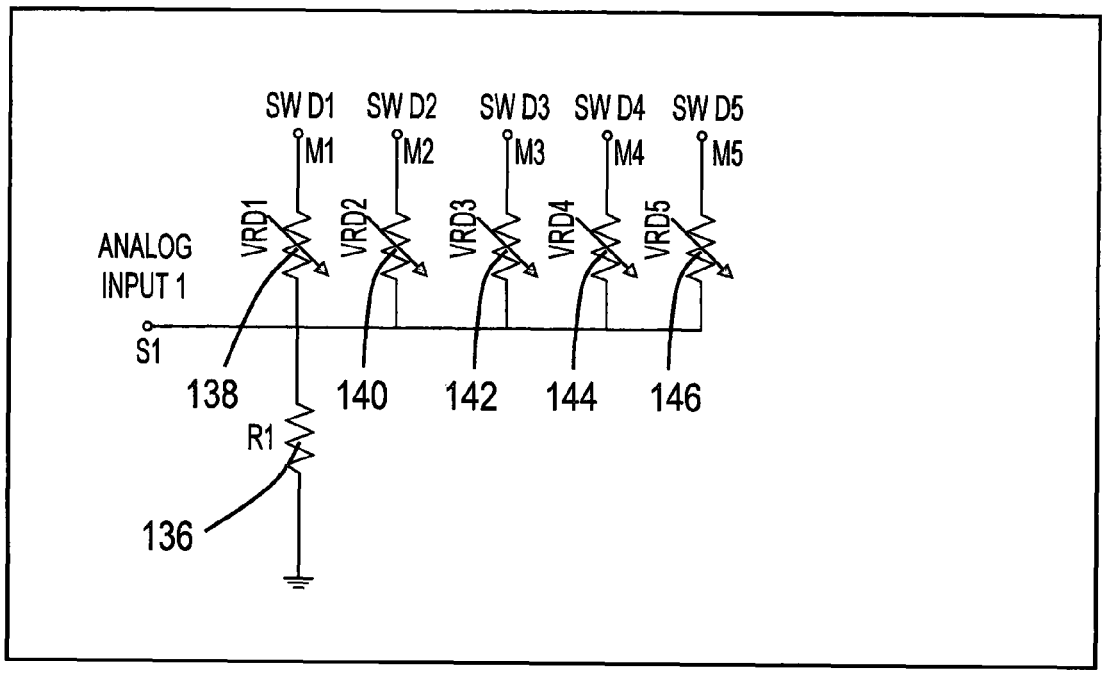

Control apparatus having a second configuration of electrodes 120 and a second voltage divider arrangement 122 is shown in FIG. 3B. The mass of resilient conductive material 56 is shown in FIG. 3B along with a voltage divider arrangement 122 comprised in processing apparatus. As can be seen from FIG. 3B, the control apparatus comprises six electrodes. A first electrode 124 is located at a centre of the mass of resilient conductive material 56 such that the first electrode 124 does not move or moves very little in response to deformation of the mass of resilient conductive material. Each of second to sixth electrodes 126 to 134 is located on a respective external surface of the mass of resilient conductive material 56 whereby each of the second to sixth electrodes moves in relation to the first electrode 124 in response to deformation of the mass of resilient conductive material. The voltage divider arrangement 122 comprises a reference resistor 136 and a biasing voltage circuit (not shown). The voltage divider arrangement 122 further comprises a first to fifth material resistances 138 to 146 with each material resistance being constituted by an electrical path between the first electrode 124 and a different one of the second to sixth electrodes 126 to 134. Thus, for example, the first material resistance 138 is constituted by the electrical path through the mass of resilient conductive material 56 between the first electrode 124 and the second electrode 126, the second material resistance 140 is constituted by the electrical path through the mass of resilient conductive material 56 between the first electrode 124 and the third electrode 128 and the third material resistance 142 is constituted by the electrical path through the mass of resilient conductive material 56 between the first electrode 124 and the fourth electrode 130.

As can be seen from the circuit diagram in FIG. 3B, the reference resistor 136 is in series with each of the five material resistances between the first electrode 124 and each of the second to sixth electrodes 126 to 134. The biasing voltage circuit is operative to apply a pulsed voltage signal to each of the second to sixth electrodes 126 to 134 in turn and on a repeating basis whereby a pulse of current passes in turn through the voltage divider pairs. A pulsed voltage signal is therefore present at the electrical connection between a material resistance and the reference resistor with the magnitude of the pulsed voltage signal corresponding to the material resistance and thus the separation between the electrodes providing the material resistance. The frequency of the pulsed voltage signal is 1 kHz. As described above with reference to FIG. 3A, adjacent high portions of the in turn applied pulsed voltage signals are time spaced apart from each other by an amount sufficient to allow for charging and discharge of parasitic capacitance present at the electrodes. As described above with reference to FIG. 3A the processing apparatus comprises a 12-bit analogue-to-digital converter which is operative to acquire and convert signals present at the electrical connections between material resistance and reference resistors. The further processing of the acquired signals with regard to deformation sensing and consequential sound production is described below with reference to FIGS. 4A and 4B.

Following acquisition of signals from the voltage divider arrangement 72, 122, the processing apparatus is operative to filter the acquired signals to reduce the like of 50 Hz noise. A filter comprised in the processing apparatus is further operative on a high pass basis to reduce low frequency signals arising from the latter stage of the mass of resilient conductive material returning to its undeformed state following deformation. Although not shown in FIGS. 3A and 3B the processing apparatus comprises the like of power supply regulation circuitry and level shift circuitry to provide for proper matching of signal levels to digital circuitry. The design of such circuitry is considered to be within the ordinary design capabilities of the skilled reader and is therefore described no further.

Figure 4A:
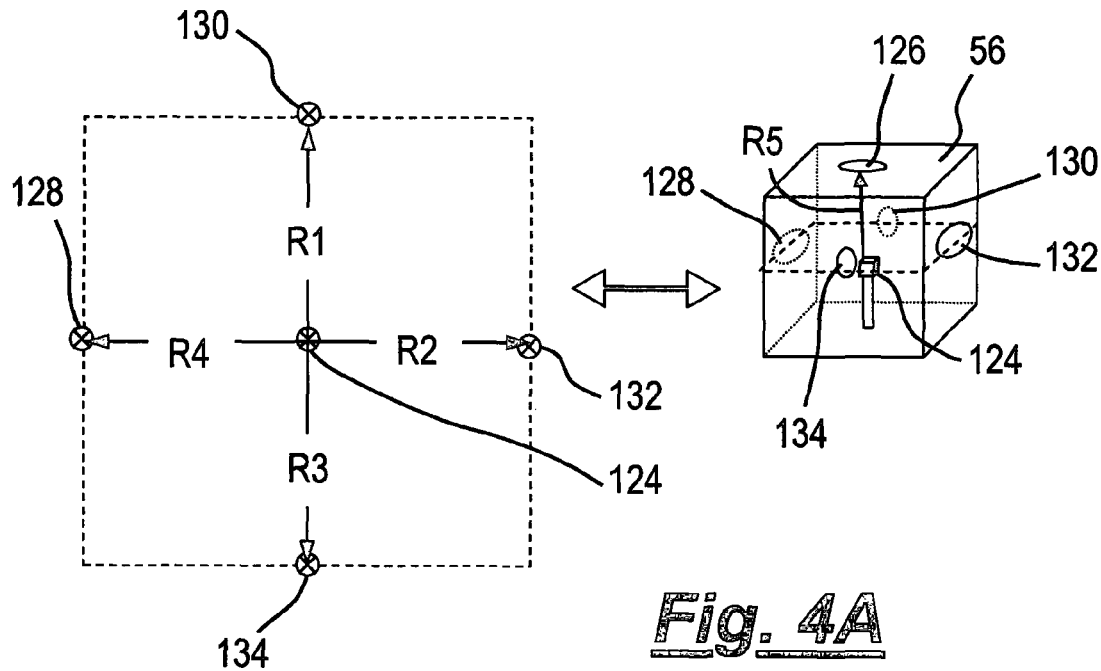
FIG. 4A shows the relative position of electrodes when the control apparatus is undeformed.
Figure 4B:
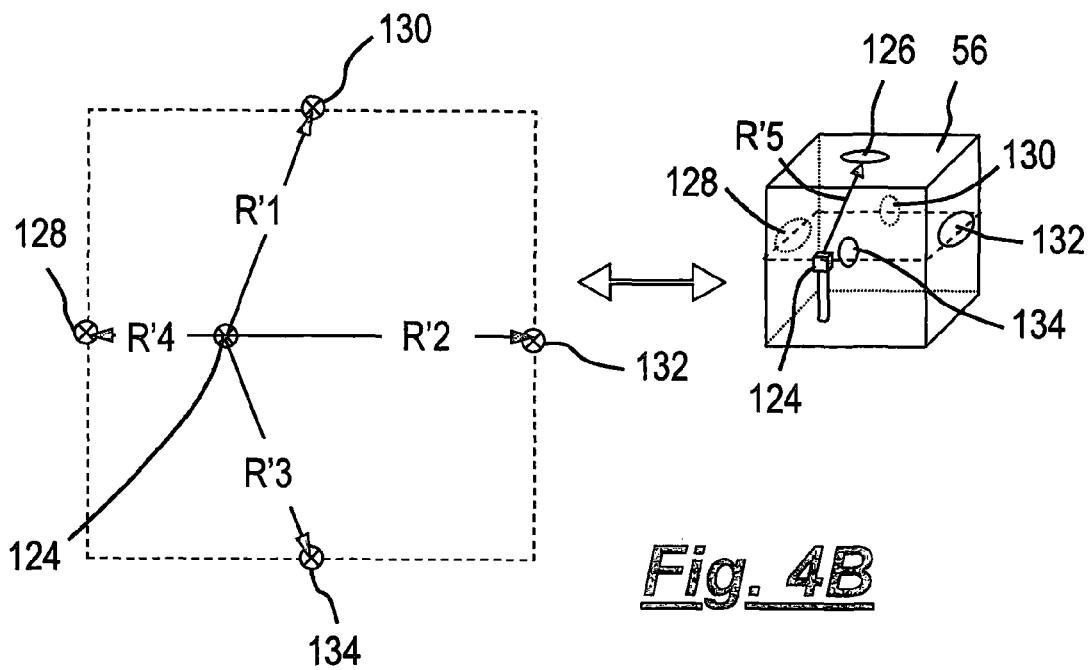
FIG. 4B shows the relative position of electrodes when the control apparatus is deformed.

Thereafter the processing apparatus is operative to perform a pattern recognition process on the acquired signals to determine directions of movement of electrodes in response to a user deforming the mass of resilient conductive material. Characteristic patterns of direction of movement of electrodes depend on the configuration of the control apparatus with regard to the shape of the mass of resilient conductive material and the location of the electrodes. A specific pattern of movement of electrodes, such as an increase, decrease or no change in separation as reflected by the measured resistance of electrode pairs is characteristic of a particular form of deformation involving movement of one or more electrodes. Certain specific patterns of movement of electrodes provide for determination of movement of two electrodes at the same time such as results from pressing opposite sides of the mass of resilient conductive material at the same time. An example characteristic pattern of movement of electrodes will now be provided with reference to FIGS. 4A and 4B. FIGS. 4A represents the location of the electrodes 124 to 134 of the embodiment of FIG. 3B when there is no deformation of the mass of resilient conductive material 56. As can be seen from FIG. 4A the second to sixth electrodes 126 to 134 are equidistantly spaced from the first electrode 124. In this state the resistances between the first electrode 124 and each of the second to fifth electrodes 126 to 134 is the same, i.e. R1=R2=R3=R4=R5. Upon depression of the side of the mass of resilient conductive material 56 bearing the third electrode 128 the separation between the first and third electrodes 124, 128 reduces producing a measurable reduction in resistance between the first and third electrodes. It was expected that the resistance between other pairs of electrodes would also decrease. However an increase in resistance between other pairs of electrodes was measured such that the following pattern was observed: R'4<R4, AND R'1>R1, R'2>R2, R'3>R3, R'5>R5. This pattern and other similar such patterns are measured during an apparatus characterisation phase and the measured patterns stored in the processing apparatus. Such patterns include the like of responses to the pressing of plural sides of the mass of resilient conductive material at the same time. During use of the control apparatus measurements are made by the control apparatus and the processing apparatus is operative to compare the measurements with the stored patterns to determine characteristic patterns of direction of movement of electrodes.

Figure 5:
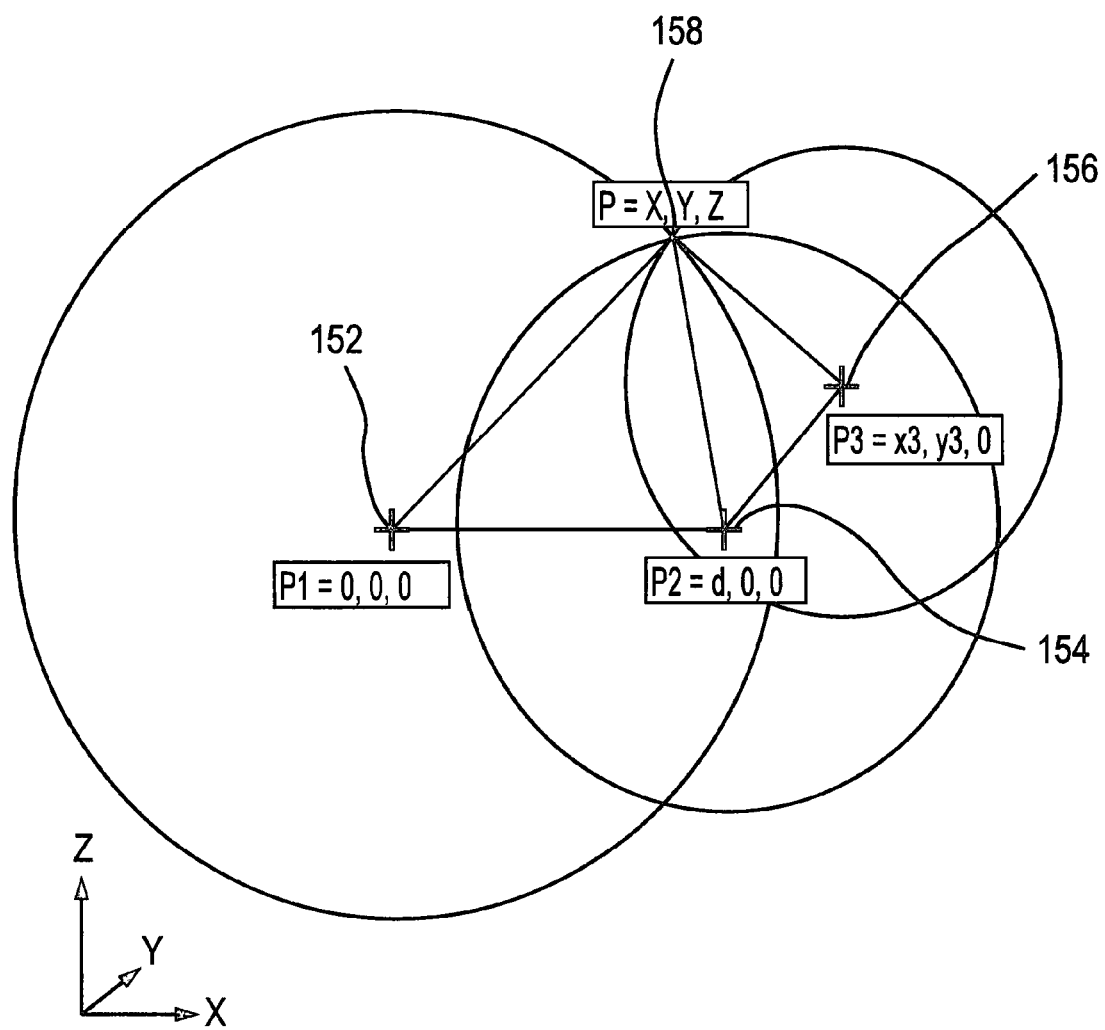
FIG. 5 represents trilateration analysis of measured signals.

After determination of a characteristic pattern of movement of the electrodes the processing apparatus is operative to perform a trilateration analysis in three dimensions of the measured signals to determine the magnitude of displacement of the electrodes. The trilateration analysis will now be described with reference to FIG. 5 which shows the location of the electrodes of control apparatus in Cartesian coordinate format. A first electrode 152 is at location 0, 0, 0, the second electrode 154 is at location d, 0, 0 such that it is at a distance 'd' along the x axis from the first electrode, the third electrode 156 is at location x3, y3, 0 such that it is at a distance 'x3' along the x axis from the first electrode and a distance 'y3' along the y axis from the first electrode and a fourth electrode 158 is at an unknown location X, Y, Z, for example, following depression of one side of the mass of resilient conductive material. Using the trilateration approach, the values of X, Y and Z can be determined whereby an extent of movement of the fourth electrode can be determined. The trilateration approach involves solving the following equations in which r1, r2 and r3 are the measured resistances between the fourth electrode 158 and each of the first to third electrodes 152, 154, 156 and d, x3 and y3 are the above noted known distances.

$$X = \frac{r1^2 - r2^2 + d^2}{2d}$$

$$Y = \frac{r1^2 - r3^2 + x3^2 + d^2}{2x3} - \frac{x3}{y3}X$$

$$Z = \pm\sqrt{r1^2 - X^2 + Y^2}$$

The above trilateration analysis is applied to measurements from different combinations of pairs of electrodes to determine the magnitude of movement of the electrodes.

The processing apparatus is operative to match detected movements of individual electrodes, extents of movement of electrodes and combinations of movement of electrodes with particular tones or combinations of tones which are then emitted by a loudspeaker comprised in the sound generation apparatus. Movement of electrodes can arise from a user pressing one or more sides of the mass of resilient conductive material at a particular time and performing more complex manipulations of the mass of resilient conductive material such as compressing the whole mass, bending the top of the mass around one or more of three mutually orthogonal axes and shearing the top of the mass along one or both of the x and y axes with respect to the base portion of the control apparatus. As mentioned above the sound generation apparatus comprises an audio synthesiser. The audio synthesiser is operative on signals received from the processing apparatus to provide for specific effects, such as a woodwind or stringed instrument effect. The sound generation apparatus can therefore be configured to operate as a musical instrument.

The control apparatus is configured to respond to the application of deformation causing pressures having a weight in the range of 1 g to 5000 g. The control apparatus is configured to measure electrode displacement to an accuracy of +−1% and to measure deformation of the mass of resilient conductive material to within +−1 mm. During use the control apparatus is operative to perform self-calibration involving measurement and storage of resistance when there is no deformation of the mass of resilient conductive material to establish a fresh baseline of resistance values. During subsequent use of the control apparatus measurements made during deformation of the mass of resilient conductive material are referred to stored resistance measurements.

In other embodiments the control apparatus of FIGS. 2, 3A and 3B is comprised in apparatus other than sound generation apparatus. Examples of such other apparatus include: gaming apparatus in which game control is by way of the control apparatus described above; and toys such as sound producing toys which are controlled by way of the control apparatus described above.

The invention claimed is:

1. Control apparatus comprising:
a mass of resilient conductive material having an electrical property which changes in dependence on deformation of the conductive material; and
at least three electrodes in contact with the mass of resilient conductive material at spaced apart locations to thereby define at least two electrical paths through the mass of resilient conductive material between at least two different pairs of the electrodes,
the control apparatus being configured such that there is a change in a measurable electrical property between each of the at least two different pairs of electrodes in dependence on deformation of the mass of resilient conductive material, more than one of the at least three electrodes moving upon deformation of the mass of resilient conductive material,
the control apparatus being further configured for determination of movement of at least one of the at least three electrodes in at least two mutually orthogonal directions, the at least three electrodes being disposed such that the at least two electrical paths defined through the mass of resilient conductive material extend in the at least two mutually orthogonal directions.

2. Control apparatus according to claim 1 in which two different pairs of electrodes have an electrode in common, the control apparatus being configured such that the at least one electrode in each of the at least two different pairs of electrodes moves relative to the other electrode in dependence on deformation of the mass of resilient conductive material to thereby change the measurable electrical property between each of the at least two different pairs of electrodes.

3. Control apparatus according to claim 1 in which the mass of resilient conductive material has a resistance which changes in dependence on deformation of the conductive material.

4. Control apparatus according to claim 1 in which the control apparatus is operative such that the at least one of the at least three electrodes electrode is a reference electrode which is common to the at least two different pairs of electrodes which each provide a measurable electrical property.

5. Control apparatus according to claim 4 in which the reference electrode is substantially immobile at least during measurement of the measurable electrical property of the at least two different pairs of electrodes.

6. Control apparatus according to claim 5 in which the reference electrode is located at or towards a base of the control apparatus such that deformation of the mass of resilient conductive material causes substantially no movement of the reference electrode.

7. Control apparatus according to claim 5 in which the reference electrode is located at a center of the mass of resilient conductive material whereby deformation of the mass of resilient conductive material causes little or substantially no movement of the reference electrode.

8. Control apparatus according to claim 4 in which one of the at least three electrodes is determined to be the reference electrode in dependence on measurements of the measurable electrical property of the at least two different pairs of electrodes.

9. Control apparatus according to claim 8 in which the control apparatus is configured to make measurements between different pair combinations of electrodes and on the basis of the measurements determine which of the electrodes is one of substantially immobile and moves the least in response to a certain form of deformation.

10. Control apparatus according to claim 4 operative such that each of plural electrodes is a reference electrode with each reference electrode being common to the at least two pairs of electrodes which each provide a measurable electrical property.

11. Control apparatus according to claim 1 configured to apply an electrical signal to each of the at least two different pairs of electrodes at different times, the measurable electrical property of each of the at least two different pairs of electrodes being measured at different times whereby movement of different electrodes are distinguishable from each other.

12. Control apparatus according to claim 11 in which the electrical signal applied to each of the at least two different pairs of electrodes is pulsed, wherein a gap is present between time adjacent high portions of respective electrical signals applied to the at least two different pairs of electrodes.

13. Control apparatus according to claim 1 comprising processing apparatus which is configured to provide a control signal in dependence on measurement of the measurable electrical property between each of the at least two different pairs of electrodes, the processing apparatus being configured to determine extent of movement of the at least one electrode of the at least three electrodes in dependence on measurement of the measurable electrical property between each of the at least two different pairs of electrodes, the control signal being provided in dependence on the movement determination.

14. Control apparatus according to claim 1 comprising processing apparatus which is configured to determine electrode movement in accordance with a three dimensional trilateration approach.

15. Control apparatus according to claim 14 in which the processing apparatus is operative to determine direction of movement in dependence on a pattern recognition approach, specific patterns of direction of movement of electrodes having been measured and stored in response to specific forms of deformation of the mass of resilient conductive material.

16. Control apparatus according to claim 1 in which the mass of resilient conductive material is configured to be deformable along three mutually orthogonal directions and around three mutually orthogonal axes.

17. Control apparatus according to claim 1 further comprising audio apparatus which is operative in dependence on measurement of the measurable electrical property of the at least two different pairs of electrodes.

18. Control apparatus according to claim 1 in which each of the at least two electrical paths defined through the mass of resilient conductive material comprises vector components that extend solely in at least two mutually orthogonal directions of the vector components.

19. Sound generating apparatus comprising control apparatus according to claim 1 and audio apparatus which is operative to emit sound in dependence on a signal received from the control apparatus.

\* \* \* \* \*